United States Patent
Seo et al.

(10) Patent No.: US 8,483,162 B2
(45) Date of Patent: Jul. 9, 2013

(54) METHOD AND DEVICE FOR ALLOCATING IDENTIFIERS TO USER EQUIPMENT IN CELLULAR SYSTEM

(75) Inventors: Dong Youn Seo, Seoul (KR); Joon Kui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 333 days.

(21) Appl. No.: 12/990,751

(22) PCT Filed: Aug. 12, 2009

(86) PCT No.: PCT/KR2009/004501
§ 371 (c)(1),
(2), (4) Date: Nov. 2, 2010

(87) PCT Pub. No.: WO2010/018994
PCT Pub. Date: Feb. 18, 2010

(65) Prior Publication Data
US 2011/0044282 A1   Feb. 24, 2011

Related U.S. Application Data

(60) Provisional application No. 61/088,708, filed on Aug. 13, 2008.

(30) Foreign Application Priority Data

Jul. 31, 2009 (KR) .................. 10-2009-0070620

(51) Int. Cl.
*H04W 4/00* (2009.01)

(52) U.S. Cl.
USPC ......... 370/329; 455/402; 455/422.1; 455/450

(58) Field of Classification Search
None
See application file for complete search history.

(56) References Cited

U.S. PATENT DOCUMENTS

| | | | |
|---|---|---|---|
| 2002/0168984 A1* | 11/2002 | Wallentin ................. | 455/452 |
| 2003/0211846 A1* | 11/2003 | Nagpal et al. ............. | 455/434 |
| 2005/0009527 A1* | 1/2005 | Sharma .................... | 455/445 |
| 2006/0140158 A1* | 6/2006 | Terry ....................... | 370/335 |
| 2006/0156184 A1* | 7/2006 | Kim et al. ................. | 714/758 |
| 2007/0133458 A1 | 6/2007 | Chandra et al. | |
| 2007/0155390 A1 | 7/2007 | Kodikara Patabandi et al. | |
| 2007/0258402 A1 | 11/2007 | Nakamata et al. | |
| 2008/0159323 A1 | 7/2008 | Rinne et al. | |
| 2010/0323736 A1* | 12/2010 | Fischer et al. ............ | 455/509 |

* cited by examiner

*Primary Examiner* — Charles C Jiang
(74) *Attorney, Agent, or Firm* — Birch, Stewart, Kolasch & Birch, LLP

(57) ABSTRACT

A method of receiving a control channel at a user equipment (UE) in a wireless mobile communication system is disclosed. This method comprises receiving a common control channel transferred from a base station. In this case, a first user equipment (UE) ID allocated to the UE is represented by 'x' bits, and a second UE ID allocated to another UE receiving a dedicated control channel transferred from the base station is represented by 'y' bits (where x<y).

19 Claims, 15 Drawing Sheets

METHOD AND DEVICE FOR ALLOCATING IDENTIFIERS TO USER EQUIPMENT IN CELLULAR SYSTEM

CROSS-REFERENCE TO RELATED APPLICATIONS

This application is the National Phase of PCT/KR2009/004501 filed on Aug. 12, 2009, which claims priority under 35 U.S.C. 119(e) to U.S. Provisional Application No. 61/088,708 filed on Aug. 13, 2008 and under 35 U.S.C. 119(a) to Patent Application No. 10-2009-0070620 filed in the Republic of Korea on Jul. 31, 2009, all of which are hereby expressly incorporated by reference into the present application.

TECHNICAL FIELD

The present invention relates to a wireless mobile communication system, and more particularly, to a user or a user group that will receive a control channel used when scheduling radio resources for uplink/downlink (UL/DL) packet data transmission in a cellular wireless communication system capable of using multiple frequency bands, or a user equipment (UE) identifier (ID) for discriminating a common control signal.

BACKGROUND ART

A $3^{rd}$ Generation Partnership Project Long Term Evolution (3GPP LTE) communication system (hereinafter referred to as an "LTE system" for convenience of description) will hereinafter be described as an example of a mobile communication system applicable to the present invention.

A frame structure for use in the LTE system will hereinafter be described. The LTE system supports a type 1 radio frame structure applicable to frequency division duplex (FDD), and a type 2 radio frame structure applicable to time division duplex (TDD).

FIG. 1 shows a structure of a type 1 radio frame used in the LTE system. The type 1 radio frame includes 10 subframes, each of which consists of two slots. A time length of each constituent unit is shown in FIG. 1.

FIG. 2 shows a structure of a type 2 radio frame used in the LTE system. The type 2 radio frame includes two half-frames, each of which is composed of five subframes, a downlink piloting time slot (DwPTS), a guard period (GP), and an uplink piloting time slot (UpPTS), in which one subframe consists of two slots. That is, one subframe is composed of two slots irrespective of the radio frame type. A time length of each constituent unit is shown in FIG. 2.

A resource grid structure for use in the LTE system will hereinafter be described in detail.

FIG. 3 shows an uplink (UL) time-frequency resource grid structure for use in the 3GPP LTE system.

Referring to FIG. 3, an uplink signal transmitted from each slot can be described by a resource grid including $N_{RB}^{UL} N_{SC}^{RB}$ subcarriers and $N_{symb}^{UL}$ Single Carrier—Frequency Division Multiple Access (SC-FDMA) symbols. Here, $N_{RB}^{UL}$ represents the number of resource blocks (RBs) in an uplink, $N_{SC}^{RB}$ represents the number of subcarriers constituting one RB, and $N_{symb}^{UL}$ represents the number of SC-FDMA symbols in one uplink slot. The number of SC-FDMA symbols contained in one slot may be differently defined according to the length of a Cyclic Prefix (CP) and the spacing between subcarriers.

Each element contained in the resource grid is called a resource element (RE), and can be identified by an index pair (k,l) contained in a slot, where k is an index in a frequency domain and is set to any one of 0, ..., $N_{RB}^{UL} N_{sc}^{RB} - 1$, and l is an index in a time domain and is set to any one of 0, ..., $N_{symb}^{UL} - 1$.

A Physical Resource Block (PRB) is defined by $N_{symb}^{UL}$ consecutive SC-FDMA symbols in a time domain and $N_{SC}^{RB}$ consecutive subcarriers in a frequency domain. Therefore, one PRB in an uplink may be composed of $N_{symb}^{UL} \times N_{SC}^{RB}$ resource elements.

FIG. 4 shows a downlink (DL) time-frequency resource grid structure for use in the LTE system.

Referring to FIG. 4, a downlink signal transmitted from each slot can be described by a resource grid including $N_{RB}^{DL} N_{SC}^{RB}$ and $N_{symb}^{DL}$ OFDM symbols. Here, $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbols in one downlink slot. The number of OFDM symbols contained in one slot may be differently defined according to the length of a Cyclic Prefix (CP) and the subcarrier spacing. When transmitting data or information via multiple antennas, one resource grid for each antenna port may be defined.

Each element contained in the resource grid is called a resource element (RE), and can be identified by an index pair (k,l) contained in a slot, where k is an index in a frequency domain and is set to any one of 0, ..., $N_{RB}^{DL} N_{sc}^{RB} - 1$, and l is an index in a time domain and is set to any one of 0, ..., $N_{symb}^{DL} - 1$.

Resource blocks (RBs) shown in FIGS. 3 and 4 are used to describe a mapping relationship between certain physical channels and resource elements (REs). The RBs can be classified into physical resource blocks (PRBs) and virtual resource blocks (VRBs). Although the above mapping relationship between the VRBs and the PRBs has been disclosed on a downlink basis, the same mapping relationship may also be applied to an uplink.

One PRB is defined by $N_{symb}^{DL}$ consecutive OFDM symbols in a time domain and $N_{SC}^{RB}$ consecutive subcarriers in a frequency domain. Therefore, one PRB may be composed of $N_{symb}^{DL} \times N_{SC}^{RB}$ resource elements.

The VRB may have the same size as that of the PRB. Two types of VRBs are defined, the first one being a localized VRB (LVRB) and the second one being a distributed type (DVRB). For each VRB type, a pair of VRBs in two slots of one subframe may assigned a single VRB number $n_{VRB}$.

The VRB may have the same size as that of the PRB. Two types of VRBs are defined, the first one being a localized VRB (LVRB) and the second one being a distributed VRB (DVRB).

In the LTE system based on an Orthogonal Frequency Division Multiple Access (OFDMA) scheme, a resource area in which each UE is able to transmit or receive data to and from a base station (BS) is allocated from the BS to the UE. In this case, not only a time domain but also a frequency domain must be simultaneously allocated to the UE so as to complete resource allocation.

In a wireless mobile communication system such as the LTE system, the time-frequency resources include the above-mentioned resource blocks. A data channel or a control channel is allocated to a certain area of the above time-frequency resources, and is then transmitted and/or received. In this case, if it is assumed that the time-frequency resources allocated to a control channel are limited, information of the control channel can be transmitted at a lower coding rate as the amount of information allocated to the limited resources becomes lowered. As a result, a reception error rate of the control channel can be further lowered.

DISCLOSURE

Technical Problem

An object of the present invention devised to solve the problem lies in a method and apparatus for reducing the number of bits needed for transmitting a common user equipment (UE) ID (Identifier), thus transmitting information of a common control channel at a low coding rate for a UE having a poor channel status.

Another object of the present invention devices to solve the problem lies in a method for discriminating between a common control channel and a dedicated control channel using length information of such control channels.

Technical Solution

The object of the present invention can be achieved by providing a method for controlling a user equipment (UE) to receive a control channel in a wireless mobile communication system, the method including receiving a common control channel from a base station, wherein a first user equipment (UE) ID allocated to the UE is represented by x bits, and a second UE ID allocated to another UE receiving a dedicated control channel transferred from the base station is represented by y bits (where x<y).

In another aspect of the present invention, there is provided a method for transmitting a control channel in a wireless mobile communication system, the method including transmitting, by a base station, a common control channel to a first user equipment (UE), wherein a first UE ID allocated to the first UE is represented by x bits, and a second UE ID allocated to a second UE receiving a dedicated control channel transferred from the base station is represented by y bits (where x<y).

In another aspect of the present invention, there is provided a user equipment (UE) for a wireless mobile communication system, the user equipment (UE) including a radio frequency (RF) unit, and a processor electrically connected to the RF unit, wherein the processor receives information via a common control channel transferred from a base station, a first UE ID allocated to the UE is represented by x bits, and a second UE ID allocated to another UE is represented by y bits (where x<y).

In another aspect of the present invention, there is provided a base station for a wireless mobile communication system, the base station including a radio frequency (RF) unit, and a processor electrically connected to the RF unit, wherein the processor transmits a common control channel to a first user equipment (UE), and transmits a dedicated control channel to a second UE, where a first UE ID allocated to the first UE is represented by x bits, and a second UE ID allocated to the second UE is represented by y bits (where x<y).

The common control channel may be a physical downlink control channel (PDCCH).

The first UE ID may be masked on a cyclic redundancy check (CRC) of the common control channel. In this case, the CRC of the common control channel may be represented by x bits. The second UE ID allocated to a second UE may be masked on a CYC of the dedicated control channel. In this case, the CRC of the dedicated control channel is represented by y bits (where x<y).

In another aspect of the present invention, there is provided a method for controlling a UE to receive a UE ID in a wireless mobile communication system. The method includes a PDCCH having any one of several lengths, and detecting a length of the received PDCCH. In this case, it can be determined whether the PDCCH is a dedicated control channel or a common control channel on the basis of the PDCCH length. In this case, if the detected PDCCH length has a first predetermined value, all values capable of being represented by a bit field indicating a UE ID included in the PDCCH indicate only the common UE IDs. Otherwise, if the detected PDCCH length has another value instead of the first value, all values capable of being represented by a bit field indicating a UE ID included in the PDCCH indicate only the dedicated UE IDs.

In another aspect of the present invention, there is provided a method for controlling a UE to receive a UE ID in a wireless mobile communication system. The method includes receiving a PDCCH having any one of several lengths, detecting a length of the received PDCCH, and reading a UE ID included in the PDCCH. In this case, if the detected PDCCH length has a first predetermined value, all values capable of being represented by a bit field indicating a UE ID included in the PDCCH indicate only the common UE IDs. Otherwise, if the detected PDCCH length has another value instead of the first value, all values capable of being represented by a bit field indicating the read UE ID indicate only the dedicated UE IDs. In this case, it can be determined whether the PDCCH is a dedicated control channel or a common control channel on the basis of the above length instead of the above ID.

In another aspect of the present invention, there is provided a method of receiving a control channel at a user equipment (UE) in a wireless mobile communication system. The method comprises receiving, at the UE, a control channel transferred from a base station. In this case, if the control channel is a common control channel, a UE ID (identifier) of the UE is represented by x bits, else if the control channel is a dedicated control channel, the UE ID of the UE is represented by y bits, and x<y is satisfied.

In another aspect of the present invention, there is provided a method of transmitting a control channel in a wireless mobile communication system. The method comprises transmitting, at a base station, a control channel to a user equipment (UE). In this case, if the control channel is a common control channel, a UE ID (identifier) of the UE is represented by x bits, else if the control channel is a dedicated control channel, the UE ID of the UE is represented by y bits, and x<y is satisfied.

In another aspect of the present invention, there is provided a user equipment (UE) for a wireless mobile communication system. The user equipment comprises a radio frequency (RF) unit; and a processor electrically connected to the RF unit. In this case, the processor is configured to receive a control channel transferred from a base station through the RF unit, if the control channel is a common control channel, a UE ID (identifier) of the UE is represented by x bits, else if the control channel is a dedicated control channel, the UE ID of the UE is represented by y bits, and x<y is satisfied.

In another aspect of the present invention, there is provided a base station for a wireless mobile communication system. The base station comprises a radio frequency (RF) unit, and a processor electrically connected to the RF unit. In this case, the processor is configured to transmit a control channel to a user equipment (UE) through the RF unit, if the control channel is a common control channel, a UE ID (identifier) of the UE is represented by x bits, else if the control channel is a dedicated control channel, the UE ID of the UE is represented by y bits, and x<y is satisfied.

Preferably, the UE ID is masked on a cyclic redundancy check (CRC) of the control channel. Preferably, if the control channel is the common control channel, a CRC length z of the control channel is equal to or greater than x and less than y, and if the control channel is the dedicated control channel, a CRC length of the control channel is equal to or greater than y. Preferably, the control channel is a PDCCH (Physical Downlink Control Channel).

Preferably, a ratio of a code rate of the common control channel to a code rate of the dedicated control channel is determined based on a ratio of x to y.

Advantageous Effects

The present invention can transmit information of a common control channel at a low coding rate for a user equipment (UE) having a poor channel status. In addition, the present invention can discriminate between a common control channel and a dedicated control channel using length information of such control channels.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. For example, the following description will be given centering upon a mobile communication system serving as an LTE system, but the present invention is not limited thereto and the remaining parts of the present invention other than unique characteristics of the LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of the important functions of the present invention. Wherever possible, the same reference numbers will be used throughout the drawings to refer to the same or like parts.

In the following description, a terminal may include mobile or fixed user equipments (UEs), for example, a user equipment (UE), a mobile station (MS) and the like, and may also be referred to in any of these ways as necessary. Also, the base station (BS) may be any of nodes included in a network communicating with the UE, for example, a Node B (Node-B) and an eNode B (eNB, eNode-B), and may also be referred to in any of these ways.

As an example of the mobile communication system applicable to the present invention, a Long Term Evolution (LTE) communication system will hereinafter be described in detail.

In a mobile communication system, a UE can receive information from a base station (BS) via a downlink, and the UE can also transmit information via an uplink. Information transferred from—or received by—the UE may be data, other control information, and the like, and there are a variety of physical channels according to types and usages of this information transferred or received from or in the UE.

Figure 1:
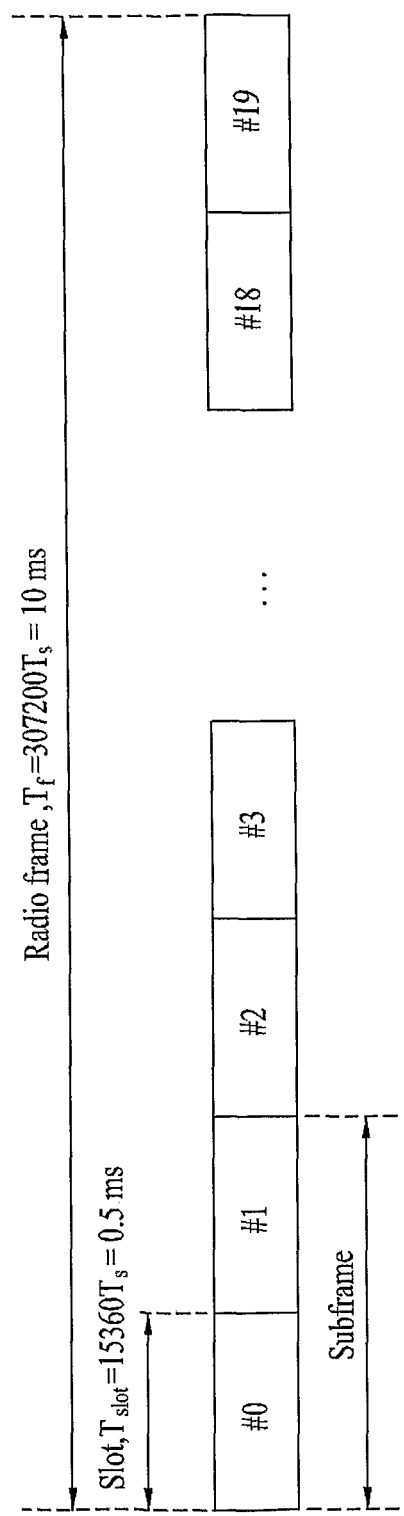
FIG. 1 shows a structure of a type 1 radio frame used in an LTE system.
Figure 2:
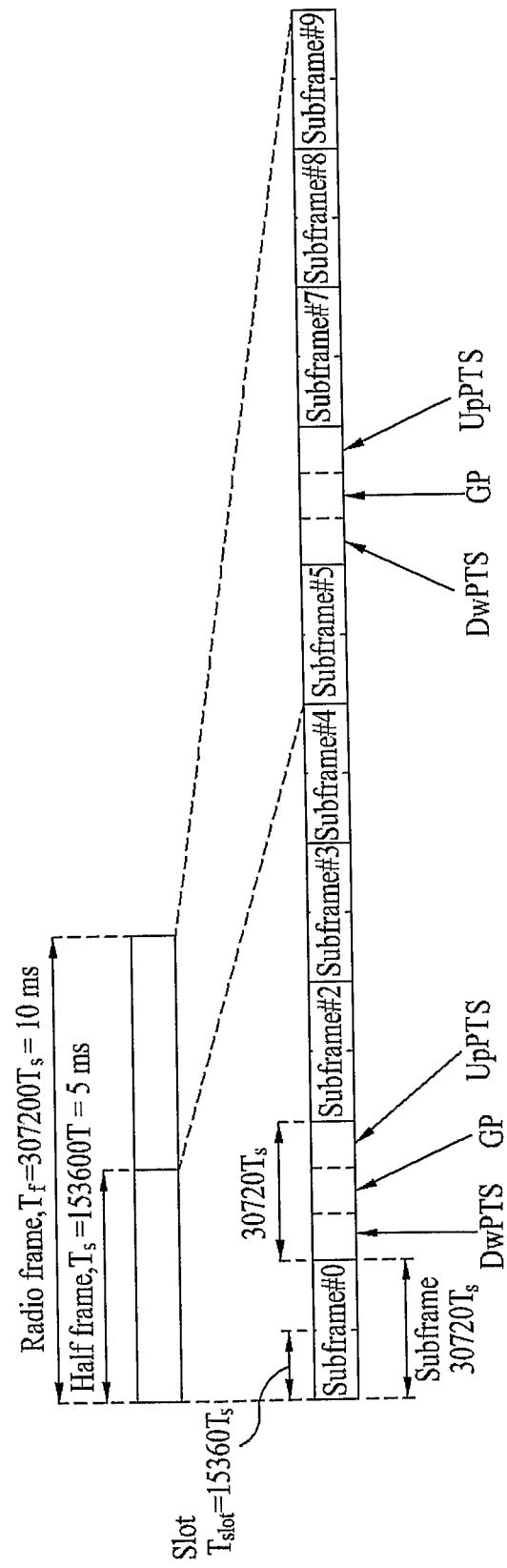
FIG. 2 shows a structure of a type 2 radio frame used in an LTE system.
Figure 3:
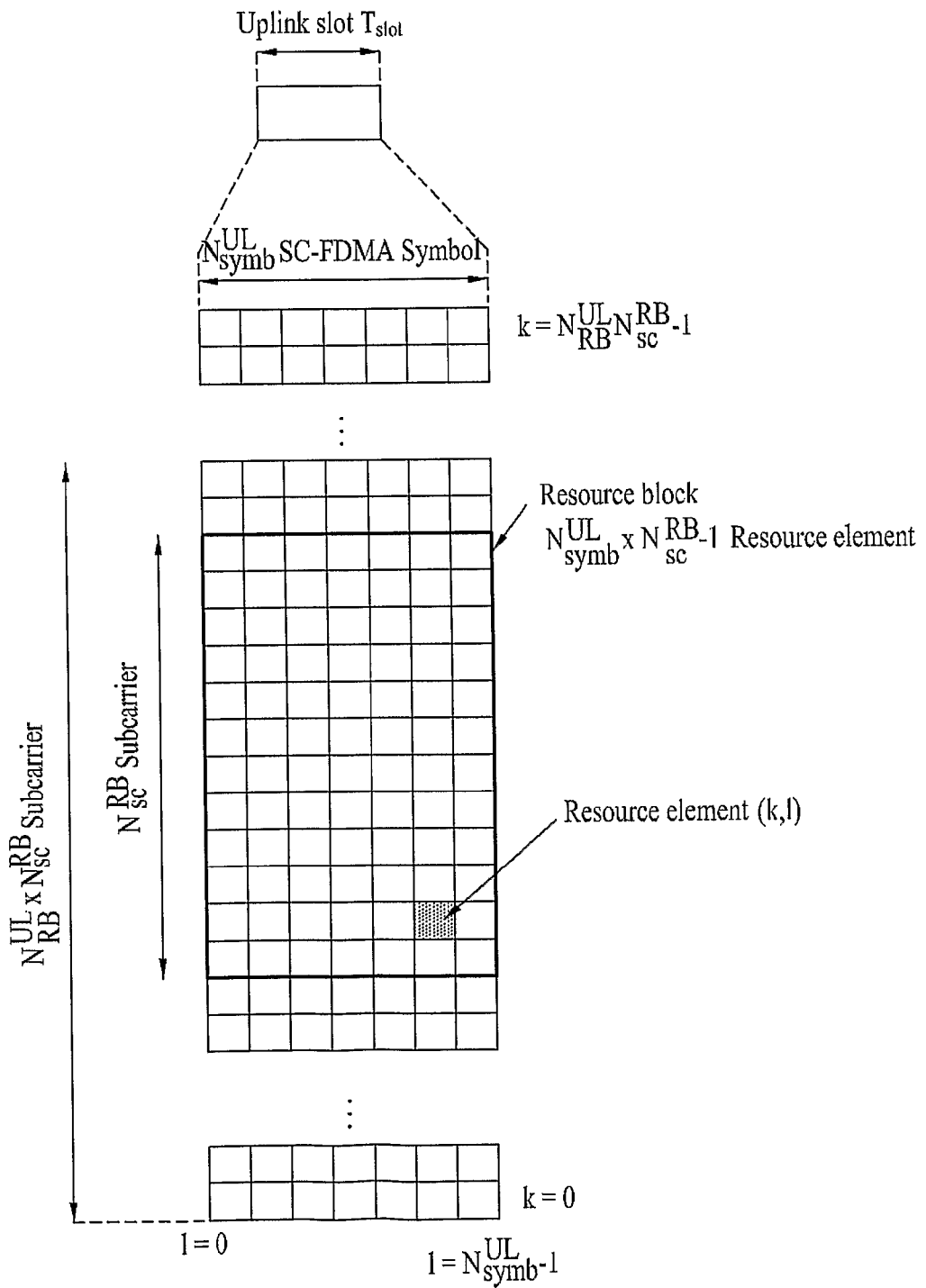
FIG. 3 shows an uplink (UL) time-frequency resource grid structure for use in an LTE system.
Figure 4:
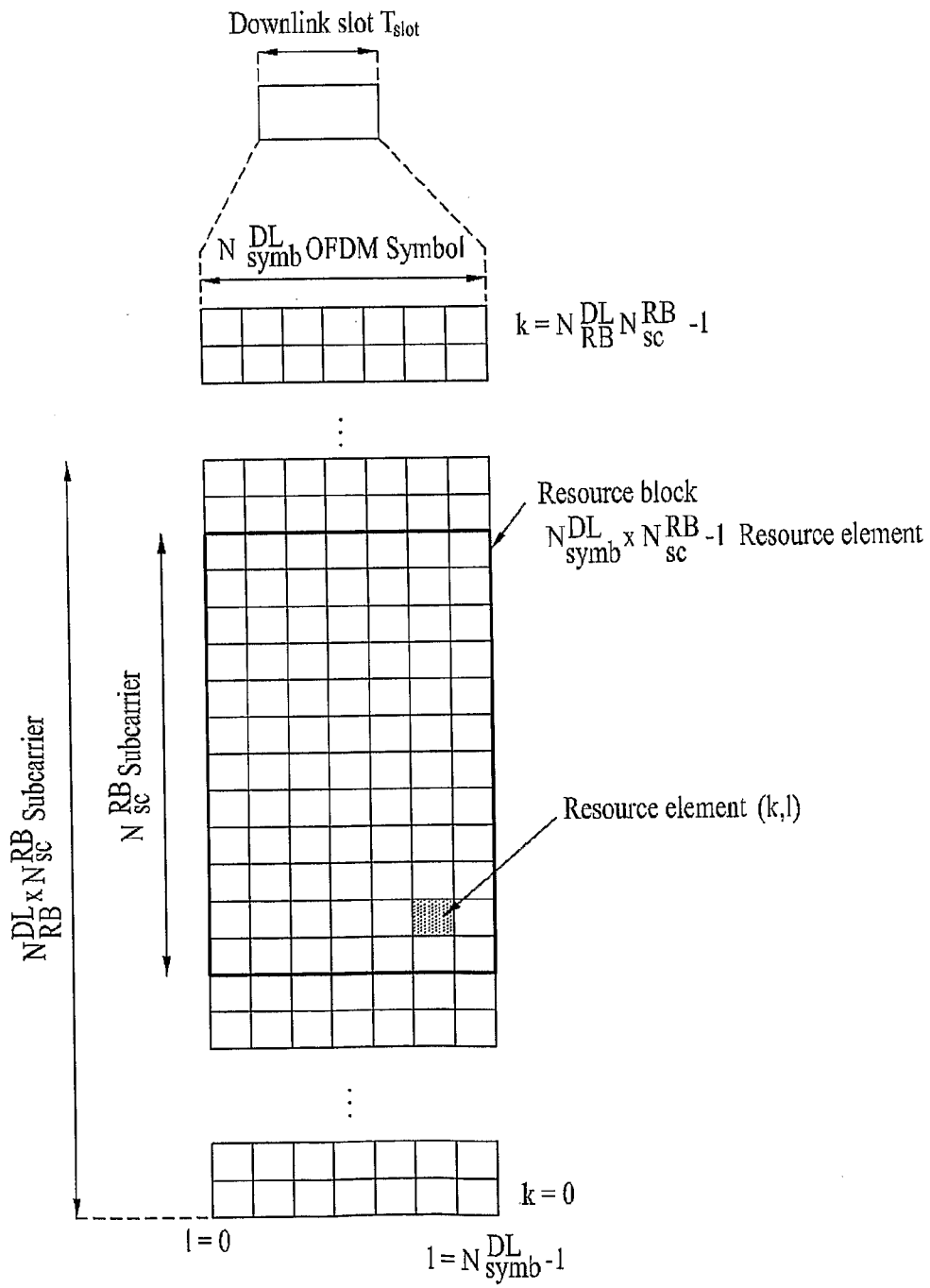
FIG. 4 shows a downlink (DL) time-frequency resource grid structure for use in an LTE system.
Figure 5:
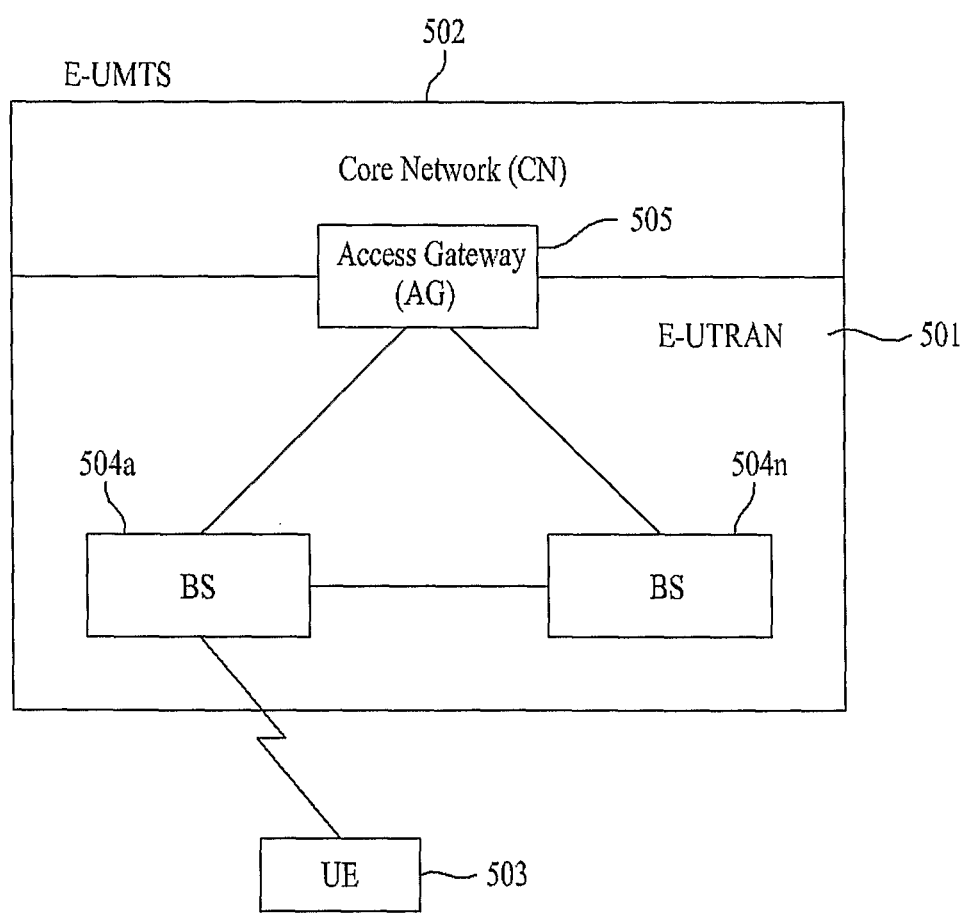
FIG. 5 is a block diagram illustrating an Evolved Universal Mobile Telecommunications System (E-UMTS) network structure as an example of a mobile communication system.

FIG. 5 shows an Evolved Universal Mobile Telecommunications System (E-UMTS) network structure serving as an example of a mobile communication system.

The E-UMTS system is an evolved version of the conventional Universal Mobile Telecommunications System (UMTS) system and basic standardization thereof is in progress under the 3rd Generation Partnership Project (3GPP). Generally, the E-UMTS is also referred to as a Long Term Evolution (LTE) system.

The E-UMTS network may be classified into an Evolved—UMTS Terrestrial Radio Access Network (E-UTRAN) 501 and a Core Network (CN) 502. The E-UTRAN includes a UE 503, a BS (eNB or eNode B) 504, and an Access Gateway (AG) 505 which is located at an end of a network and is connected to an external network. The AG 505 can be divided into a part that handles processing of user traffic and a part that handles control traffic. Here, the AG part 505 for processing new user traffic and the AG part for processing control traffic can communicate with each other using a new interface.

One or more cells may exist for one eNB. An interface for transmitting user traffic or control traffic can be used between eNBs. A Core Network (CN) 502 may include the AG 505 and a node or the like for user registration of the UE 503. An interface for discriminating between the E-UTRAN 501 and the CN 502 may be used.

Radio interface protocol layers between the UE and the network can be classified into an L1 layer (first layer), an L2 layer (second layer) and an L3 layer (third layer) on the basis of the lower three layers of the Open System Interconnection (OSI) reference model widely known in communication systems. A physical layer belonging to the L1 layer provides an information transfer service utilizing a physical channel. A Radio Resource Control (RRC) layer located at the L3 layer controls radio resources between the UE and the network. For this operation, RRC messages are exchanged between the UE and the network via the RRC layers. The RRC layers may be distributed among base stations (BSs) 504 and network nodes, or may be located only at a base station (BSs) 504 or the AG 505.

Figure 6:
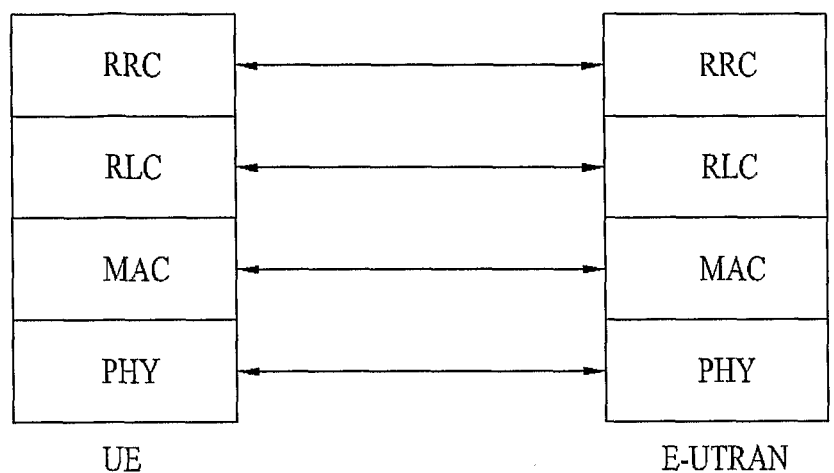
FIGS. 6 and 7 illustrate radio interface protocol structures between a UE and a UMTS Terrestrial Radio Access Network (UTRAN) that are based on an LTE radio access network standard.
Figure 7:
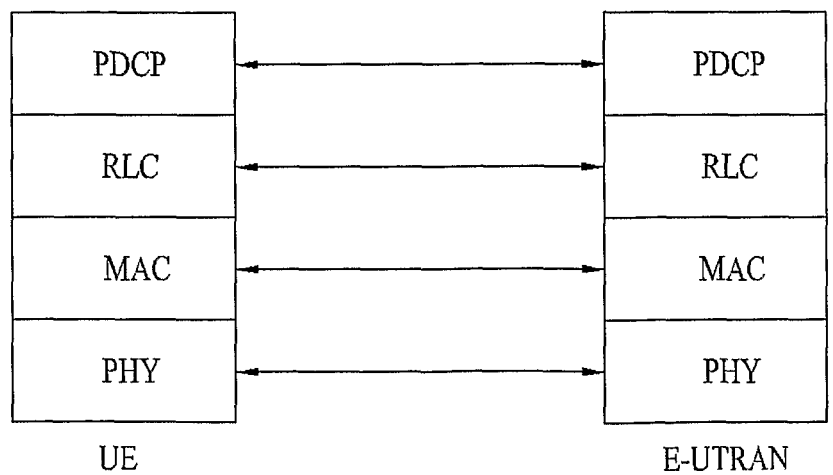

FIG. 6 and FIG. 7 illustrate radio interface protocol structures between a UE and a UTRAN that are based on an LTE radio access network standard.

The radio interface protocol of FIG. 6 or FIG. 7 is divided horizontally into a physical layer, a data link layer and a network layer, and vertically into a user plane for transmitting data information and a control plane for transmitting a control signal such as a signaling message. In more detail, FIG. 6 shows individual layers of a radio protocol control plane and FIG. 7 shows individual layers of a radio protocol user plane. Protocol layers of FIGS. 6 and 7 can be classified into an L1 layer (first layer), an L2 layer (second layer) and an L3 layer (third layer) on the basis of the lower three layers of the OSI reference model widely known in communication systems.

The following is a detailed description of respective layers of the radio protocol control plane of FIG. 6 and the radio protocol user plane of FIG. 7.

The physical layer, which is the first layer, provides an information transfer service to an upper layer using a physical channel. The physical layer (PHY) is connected to a Medium Access Control (MAC) layer, located above the physical layer, through a transport channel. Data is transferred between the MAC layer and the physical layer through the transport channel. In this case, the transport channel is classified into a dedicated transport channel and a common transport channel according to whether or not a channel is shared. Data transfer between different physical layers, specifically between the respective physical layers of a transmitter and a receiver, is performed through the physical channel.

A variety of layers exist in the second layer (L2 layer). The MAC layer maps various logical channels to various transport channels, and performs logical-channel multiplexing for mapping various logical channels to one transport channel. The MAC layer is connected to the RLC (Radio Link Control) layer serving as an upper layer through a logical channel. The logical channel can be classified into a control channel for transmitting information of a control plane and a traffic channel for transmitting information of a user plane according to categories of transmission information.

The RLC layer of the second layer performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets such as IPv4 or IPv6 packets in a radio interval with a narrow bandwidth. As a result, only information required for a header part of data can be transmitted, so that transmission efficiency of the radio interval can be increased. In addition, in the LTE system, the PDCP layer performs a security function, this security function is composed of a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers. The Radio Bearer is a logical path that the first and second layers (L1 and L2) provide for data communication between the UE and the UTRAN. Generally, Radio Bearer configuration means that a radio protocol layer needed for providing a specific service, and channel characteristics are defined and their detailed parameters and operation methods are configured. The Radio Bearer is classified into a Signaling Radio Bearer and a Data Radio Bearer. The Signaling Radio Bearer is used as a transmission passage of RRC messages in the C-plane, and the Data Radio Bearer is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as HARQ ACK or NACK Scheduling Request (SR) and Channel Quality Indicator (CQI) report information, received from first and second layers (L1 and L2).

Figure 8:
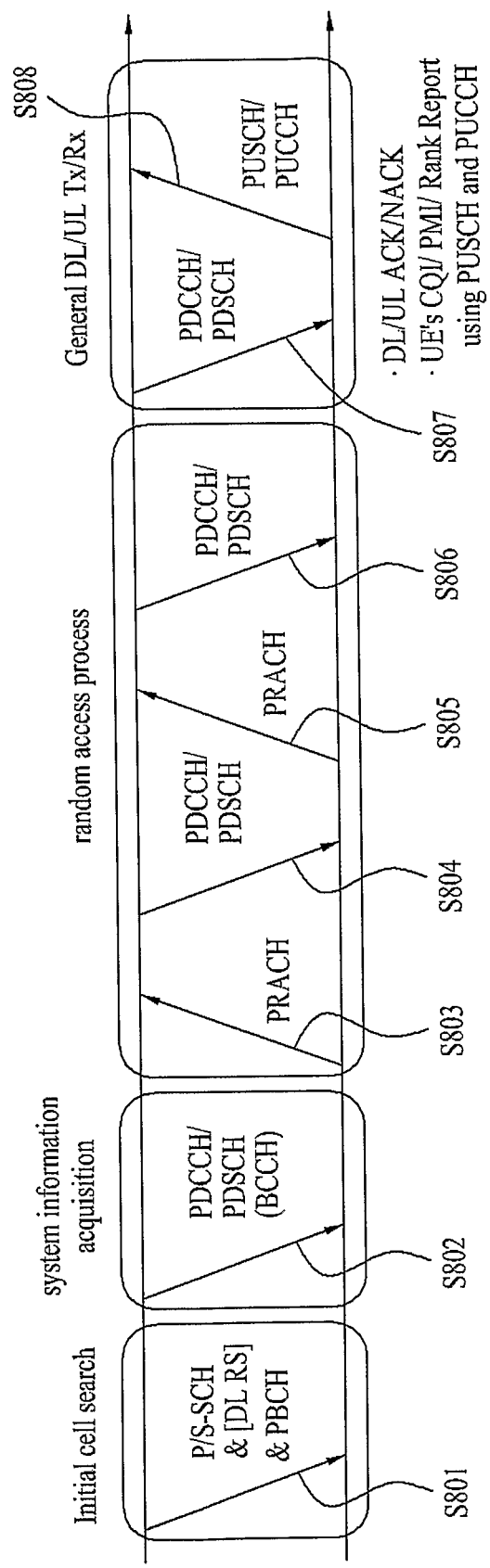
FIG. 8 shows physical channels used for an LTE system and a general signal transmission method capable of using the physical channels.

FIG. 8 shows physical channels used for an LTE system serving as an example of a mobile communication system and a general signal transmission method capable of using the physical channels.

If a UE is re-powered on after being powered off or newly enters a cell region, the UE performs an initial cell search process, such as synchronization with a base station (BS), at step S801. For the initial cell search process, the UE receives information of a Primary Synchronization Channel (P-SCH) and information of a Secondary Synchronization Channel (S-SCH) from the base station (BS), is synchronized with the BS, and is able to acquire information such as a cell ID or the like from the BS. After that, the UE receives information of a physical broadcast channel from the BS, such that it can acquire inter-cell broadcast information from the BS. In the meantime, the UE receives a downlink reference signal (DL RS) at the initial cell searching step, so that it can recognize a downlink channel status.

After performing the initial cell search process, the UE receives information of a Physical Downlink Control Channel (PDCCH) and information of a Physical Downlink Shared Control Channel (PDSCH) based on the PDCCH information, so that it can acquire more detailed system information at step S802.

In the meantime, if a UE initially accesses the BS or has no resources for uplink transmission, the UE can perform a Random Access Procedure (RAP), such as steps S803 to S806, for the BS. For this operation, the UE transmits a specific sequence as a preamble through a Physical Random Access Channel (PRACH) at step S803, and receives a response message to the random access through a PDCCH and a PDSCH at step S804. In case of a competitive-based random access except for a handover case, a contention resolution procedure such as step S805 or S806 can then be carried out. At step S805, information is transmitted through an additional PRACH. At step S806, PDCCH/PDSCH information is received.

After performing the above-mentioned steps, as a procedure for transmitting UL/DL signals, the UE receives information of a PDCCH and a PDSCH at step S807, and transmits information through a Physical Uplink Shared Channel (PUSCH) and a Physical Uplink Control Channel (PUCCH) at step S808.

In the LTE system, a signaling process for transmitting UL/DL signals is as follows.

Figure 9:
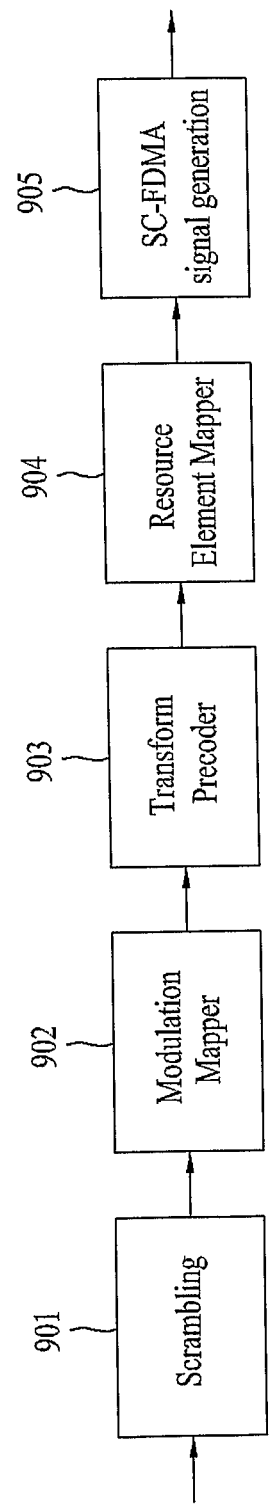
FIG. 9 is a conceptual diagram illustrating signal processing for enabling a UE to transmit an uplink signal.

FIG. 9 is a conceptual diagram illustrating signal processing for enabling a UE to transmit an uplink (UL) signal.

In order to transmit a UL signal, a scrambling module 901 of the UE can scramble a transmission signal using a specific scrambling signal of the UE. The scrambled signal is input to a modulation mapper 902, and is converted into a complex symbol using a BPSK (Binary Phase Shift Keying)—, QPSK (Quadrature Phase Shift Keying)—, or 16 QAM (Quadrature Amplitude Modulation)—scheme according to categories of the transmission signal and/or a channel status. After that, the modulated complex symbol is processed by a transform precoder 903, and is then input to the resource element mapper 904. The resource element mapper 904 is able to map a complex symbol to a time-frequency element to be used for actual transmission. The processed signal may be transmitted to the base station (BS) via the SC-FDMA signal generator 905.

Figure 10:
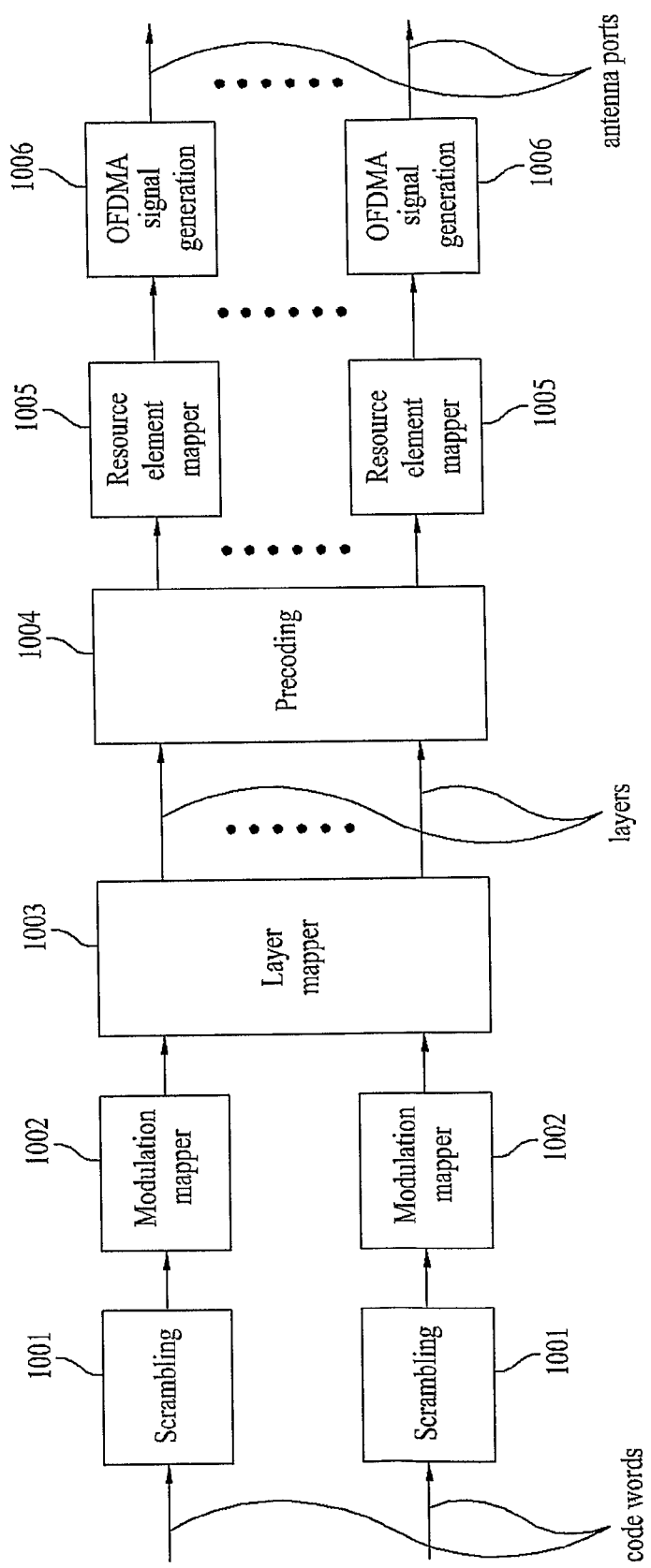
FIG. 10 is a conceptual diagram illustrating signal processing for enabling a base station (BS) to transmit a downlink signal.

FIG. 10 is a conceptual diagram illustrating signal processing for enabling the base station (BS) to transmit a downlink signal.

In the LTE system, the BS is able to transmit one or more codewords via a downlink. Therefore, one or more codewords may be processed as complex symbols by the scrambling module 1001 and the modulation mapper 1002 in the same manner as in the uplink case of FIG. 10. Thereafter, the complex symbols are mapped to a plurality of layers by the layer mapper 1003, and each layer may be multiplied by a predetermined precoding matrix selected depending on a channel status and may then be allocated to each transmission antenna by the precoding module 1004. The processed transmission signal for each antenna is mapped to a time-frequency resource element to be used for transmission by the resource element mapper 1005. After that, the mapped result can be transmitted via each antenna after passing through the Orthogonal Frequency Division Multiple Access (OFDMA) signal generator 1006.

In the case where a UE for use in a mobile communication system transmits an uplink signal, a Peak to Average Power Ratio (PAPR) may become more serious than in the case where the BS transmits a downlink signal. Thus, as described in FIGS. 9 and 10, the SC-FDMA scheme is used for uplink signal transmission in a different way from the OFDMA scheme used for downlink signal transmission.

In the LTE system, the SC-FDMA scheme for uplink signal transmission and the OFDMA scheme for downlink signal transmission will hereinafter be described in detail.

Figure 11:
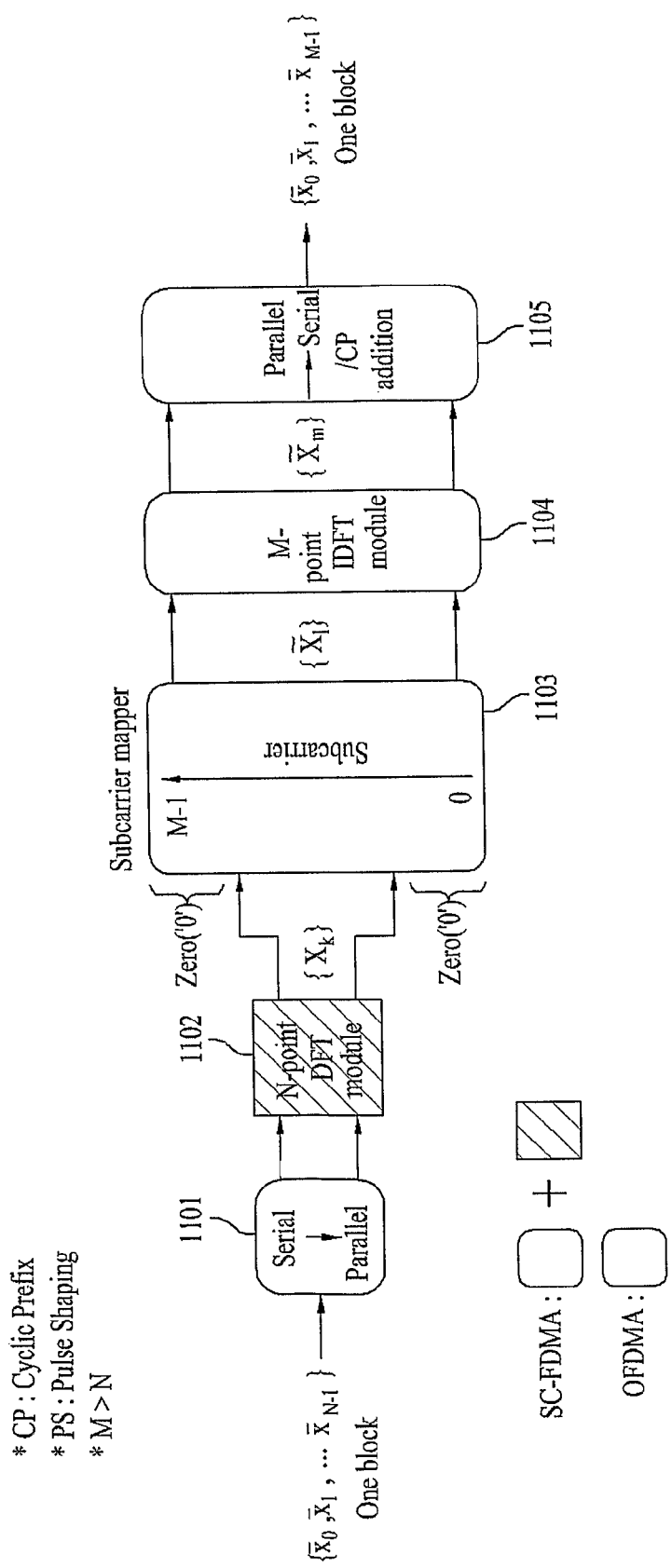
FIG. 11 is a conceptual diagram illustrating an SC-FDMA scheme for transmitting an uplink signal and an OFDMA scheme for transmitting a downlink signal in a mobile communication system.

FIG. 11 is a conceptual diagram illustrating the SC-FDMA scheme for uplink signal transmission and the OFDMA scheme for downlink signal transmission in a mobile communication system.

Referring to FIG. 11, not only a UE for transmitting an uplink signal but also a base station (BS) for transmitting a downlink signal includes a Serial-to-Parallel converter 1101, a subcarrier mapper 1103, an M-point IDFT module 1104, a Parallel-to-Serial converter 1105, and the like. However, a UE for transmitting a signal using the SC-FDMA scheme further includes an N-point DFT module 1102, and compensates for a predetermined part of the IDFT processing influence of the M-point IDFT module 1104 so that a transmission signal can have single carrier characteristics.

In a cellular communication system for allowing one BS to control a plurality of UEs, several UEs receive control information from the BS via a downlink control channel, and are assigned information of a channel via which data is transferred from among shared data channels. In the LTE system, such a control channel is referred to as a physical downlink control channel (PDCCH), and a shared data channel via which data is transferred is referred to as a physical downlink shared channel (PDSCH). The number of PDCCHs capable of being transferred from a base station (BS) is limited. Therefore, different PDCCHs are not pre-allocated to individual UEs, the BS transmits control information to an arbitrary UE via an arbitrary PDCCH, and the UE is able to recognize whether the above control information transferred via the PDCCH belongs to the UE itself on the basis of a user equipment (UE) ID contained in the PDCCH.

In the meantime, the information transferred to the PDSCH includes not only payload information transmitted to only a specific UE group, but also information of a common channel. For example, the common channel information may be system information (e.g., a broadcast control channel (BCH)) broadcast to an overall system, response information to uplink random access (e.g., response information to an uplink random access channel), paging channel information (PCH) information, or the like.

In other words, the UE does not discriminate a PDCCH allocated to the UE itself using only one UE ID, and is temporarily assigned several UE IDs based on a dedicated or common usage from the BS, such that the UE is able to recognize a plurality of PDCCHs allocated to the UE itself. In the LTE system, such an UE ID is referred to as a Radio Network Temporary Identifier (RNTI).

Figure 12:
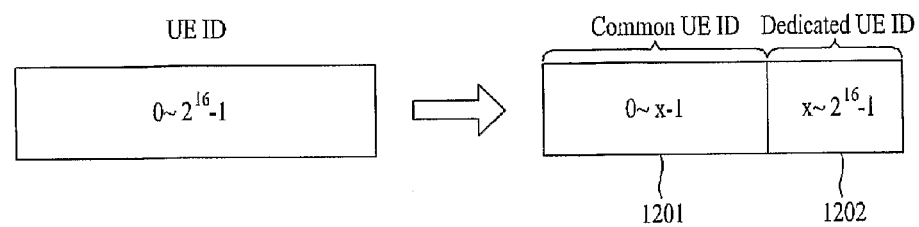
FIG. 12 is a conceptual diagram illustrating a method for constructing a user equipment (UE) ID according to the conventional art.

FIG. 12 is a conceptual diagram illustrating a method for constructing a user equipment (UE) ID according to the conventional art.

A conventional system constructs an RNTI using 16 bits, such that it generates a total of $2^{16}$ ($2^{16}$=65536) different IDs, classifies the different IDs into a common UE ID 1201 and a dedicated UE ID 1202, and finally allocates the common UE ID 1201 and the dedicated UE ID 1202 to the UE. Although values allocated to the common UE IDs 1201 are consecutive to each other as shown in FIG. 12, it should be noted that the values may not be consecutive to each other as necessary. According to this conventional method, each of the UE ID and the dedicated UE ID is represented by 16 bits.

However, assuming that the number of UEs accessing the BS increases, if the BS additionally applies the bit masking to each UE ID and transmits other control information such as a antenna selection information to the UE ID, there is a disadvantage that the number of UE IDs is insufficient or the degree of freedom in allocation is unavoidably restricted.

Figure 13:
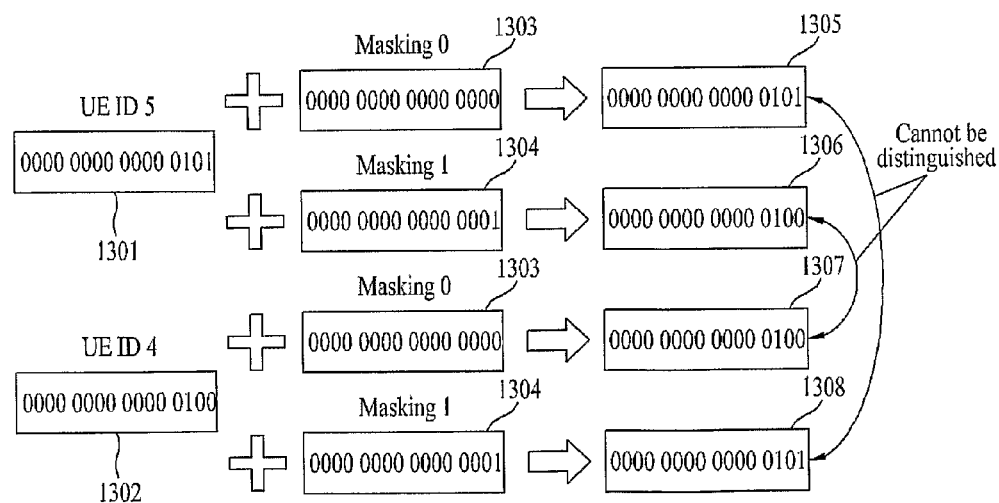
FIG. 13 shows an exemplary case in which some UE IDs cannot be distinguished from each other according to the masking usages so that it is prevented that some IDs are allocated to a UE.

FIG. 13 shows an exemplary case in which some UE IDs cannot be distinguished according to the masking usages so that it is prevented that some IDs are allocated to a UE.

For example, as shown in FIG. 13, a masking 0 (1303) and a masking 1 (1304) can be applied to each of a UE ID 5 (1301) and a UE ID 4 (1302), respectively. In this case, one value 1305 generated when the masking 0 (1303) is applied to a UE ID 5 (1301) is the same as the other value 1308 generated when the masking 1 (1304) is applied to the UE ID 4 (1302), such that the UE ID 4 (1302) and the UE ID 5 (1301) cannot be distinguished from each other. Therefore, either one of the UE ID 4 (1302) or the UE ID 5 (1301) cannot be used as an UE ID. This example of FIG. 13 is disclosed for discriminating between the common UE ID and the dedicated UE ID. However, values are not consecutively distinguished from each other as shown in FIG. 13, but they can be arbitrarily distinguished from among a total of $2^{16}$ different IDs. In this case, the above operation for constructing the UE ID using 16 bits is merely one example applicable to the LTE, and a field composed of more than 16 bits or less than 16 bits may be used to represent the UE ID.

In the meantime, if an amount of information loaded on a PDCCH increases, a UE cell coverage capable of decoding the increased information is lowered, such that there is a need for an optimum format to be established according to categories of information that must be included in the PDCCH. For this purpose, there are a variety of PDCCH downlink control information (DCI) formats.

The LTE system is able to classify the PDCCH DCI formats into a format 0, a format 1, a format 1A, a format 1B, a format 1C, and a format 2. The format 0 is used as control information for uplink resources. The format 1, the format 1A, the format 1B, and the format 2 may be used as User Equipment—Dedicated Control Information of downlink resources. The format 1C is used as common control information for downlink resources.

The length of transmission information of the format 0 is equal to that of the format 1A. However, the format 0 and the format 1A can be distinguished from each other by an indicator included in control information. Because the format 1A, the format 1B, the format 1C, and the format 2 used as control information of downlink resources have different lengths of transmission information, blind decoding is repeatedly carried out according to individual lengths and an error detection is carried out by using Cyclic Redundancy Check (CRC). By this CRC checking, respective formats can be distinguished from each other. In other words, the format 1C used as common control information and another format used as dedicated control information are distinguished from each other on the basis of length information of information. Therefore, the present invention can discriminate between the dedicated control channel and the common control channel on the basis of length information of a format of control information, without classifying the dedicated control channel and the common control channel on the basis of the UE ID. Accordingly, the present invention independently allocates a UE ID of the common control channel and a UE ID of the dedicated control channel, and performs signalling the allocated UE IDs independent of each other.

Figure 14:
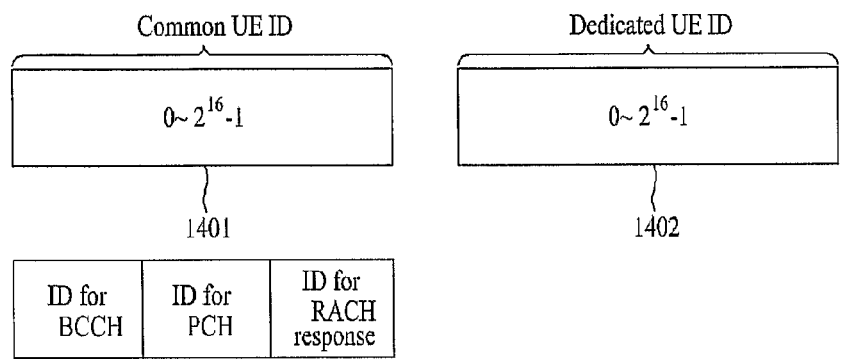
FIG. 14 shows an exemplary case in which a user equipment (UE) ID of a dedicated control channel and another UE ID of a common control channel are used independent of each other according to the present invention.

FIG. 14 shows an exemplary case in which a user equipment (UE) ID of a dedicated control channel and another UE ID of a common control channel are used independent of each other according to the present invention.

In FIG. 14, a Broadcast Control Channel (BCCH), a Paging Channel (PCH), and a Random Access Channel (RACH) response channel are used as common channels. Accordingly, each of an ID for a BCCH (hereinafter referred to as a 'BCCH ID'), an ID for a PCH, and an ID for an RACH response have a common User Equipment (UE) identifier 1401. In contrast, the dedicated control channel has a separate dedicated UE ID 1402. For example, it is assumed that an ID of a specific BCCH is given as '00000000000000011', and an ID of a specific dedicated control channel is given as '00000000000000011'. In the case where control information including ID (='00000000000000011') is transmitted and only this ID value is used, it is impossible to recognize whether this ID value indicates a dedicated control channel or a BCCH. However, if it is assumed that the length of control information including the BCCH is an L1 and the length of control information including the specific dedicated control channel is an L2, the length L1 is different from the other length L2 (L1≠L2), and the length of the received control information is blind-detected, such that it can be recognized whether the ID (='00000000000000011') indicates the BCCH or the specific dedicated control channel. Up to now, a method for discriminating a UE ID in a physical layer according to the present invention has been disclosed.

In the meantime, as described above, the common UE ID and the dedicated UE ID can be distinguished from each other in a physical layer on the basis of format length information. However, in the case where a separately-defined ID is not used in an upper layer higher than the physical layer and the aforementioned UE ID is used in this upper layer, control channels may not be distinguished from each other. For example, if the control information including the ID (ID='00000000000000011') is received as described above, and only this ID (='00000000000000011') is transmitted to the upper layer, it is impossible to recognize whether this ID indicates an ID of the BCCH or an ID of the specific dedicated control channel. In this case, if an additional ID as well as the user ID is provided to the upper layer, the upper layer is able to determine whether the control information received via the control channel is common control information or dedicated control information. In FIG. 14, an ID composed of one bit may be additionally defined or allocated, such that two UE IDs 1401 and 1402 can be distinguished from each other. For example, when transmitting the ID (='0000000000000011') from a physical layer to an upper layer, by further transmitting an ID (ID_new='0') in addition to the above ID to the upper layer, it can be indicated that the ID (ID='0000000000000011') indicates information of a BCCH. In contrast, by further transmitting an ID (ID_new='1') to the upper layer, it can be indicated that the ID (ID_new='0000000000000011') indicates information of the specific dedicated control channel. The number of new IDs which are newly added can be determined in accordance with the number of UE ID types which should be distinguished. That is, if another type of new UE ID is defined in addition to the common UE ID and the dedicated UE ID, the another type of new UE ID can be represented by a field having more than two bits.

A method for reducing the size of a bit field of a UE ID used as a common control channel and then transmitting the UE ID according to the present invention will hereinafter be described.

The common control channel is a control channel which is commonly received by all UEs or several UE groups belonging to a cell. Therefore, considering a UE located at a cell edge or a reception performance of a UE having a poor channel status, the amount of information included in the common control channel needs to be reduced if possible, and this common control channel needs to be transmitted at a low coding rate using limited transmission resources. Because the UE ID is contained in the common control channel, the amount of information of this UE ID needs to be reduced.

As can be seen from FIG. 12, all UE IDs are assigned values from 0 to $2^{16}-1$(=0~65535). Accordingly, if the range of an UE ID for use in the common control channel is not limited, 16 bits are needed to indicate all the UE IDs. However, among $2^{16}-1$ (=0~65535) values, values from 0 to $2^8-1$ (=0~255) can be represented by 8 bits, and values from 0 to $2^{12}-1$ (=0~4095) can be represented by 12 bits. Accordingly, if the UE ID of the common control channel is limited to the range of 0~255, this UE ID can be transmitted using only 8 bits. If the UE ID of the common control channel is limited to the range of 0~4095, this UE ID can be transmitted using only 12 bits.

Figure 15:
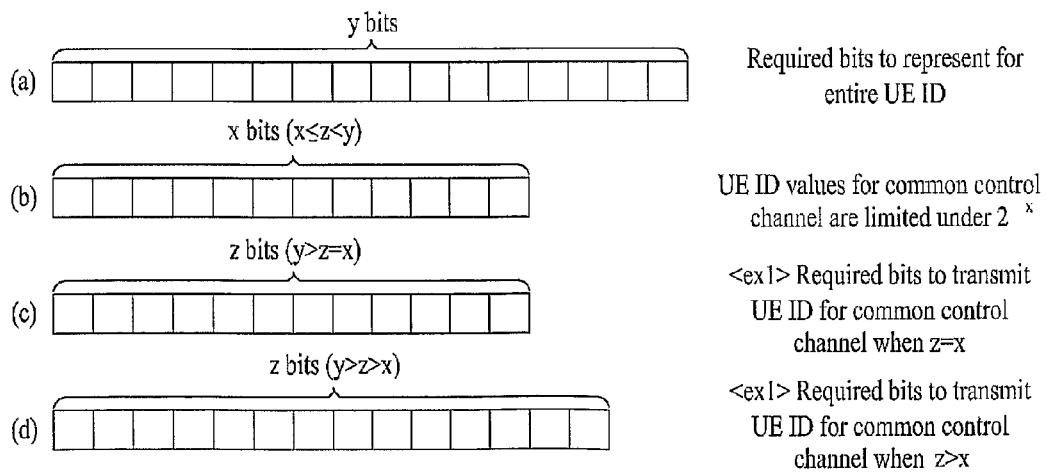
FIG. 15 is a conceptual diagram illustrating a method for limiting a bit field indicating a UE ID for a common control channel according to the present invention.

According to the method proposed by the present invention, it is assumed that the UE ID for the common control channel and the UE ID for the dedicated control channel share the entire UE ID, and that the entire UE ID is represented by a value composed of y bits as shown in FIG. 15. With this assumption, the UE ID for the common control channel is limited to have a value which is represented by total x bits, and then the UE ID is transmitted using z bits according to the present invention. Here, it is also assumed that the relation $x \leq z < y$ is satisfied. For example, the z bits may correspond to the length of a CRC when a UE UD is transmitted after masked on the CRC. In this case, the z bit is the length of the CRC used for a common control channel. When a dedicated control channel is transmitted, it is preferable to set the length of the CRC to have not less than y bits.

FIG. 15 is a conceptual diagram illustrating a method for limiting a bit field indicating a UE ID for a common control channel according to the present invention.

FIG. 15 (*a*) is an exemplary diagram in which the length of the binary bit field which is required to represent all the UE ID is y bit. FIGS. 15 (*b*), (*c*), and (*d*) represent the structure of a bit field according to the present invention in which the length z of the CRC used for the transmission of a common control channel is less than the above y, respectively. In this case, FIG. 15 (*b*) represents the case where the length x of the binary bit field indicating a UE ID used for a common control channel is equal to or less than the length z, and FIG. 15 (*c*) represents the case where the length x is equal to the length z, and FIG. 15 (*d*) represents the case where the length x is less than the length z.

Referring to FIG. 15, if the number of bits assigned for the entire UE ID is set to 'y', the conventional art illustrated in FIG. 15 has needed y bits to indicate the UE ID for a common control channel as shown in FIG. 15(*a*). In contrast, the present invention illustrated in FIG. 15 uses only x bits to indicate the UD ID for the common control channel (where x<y) as shown in FIG. 15(*b*), FIG. 15(*c*), and FIG. 15(*d*). Therefore, according to the present invention, the amount of information of the UE ID included in the common control channel is reduced such that this common control channel can be transmitted at a low coding rate. As a result, when a UE having a poor channel status receives information via the above common control channel, an error rate can be greatly reduced.

Figure 16:
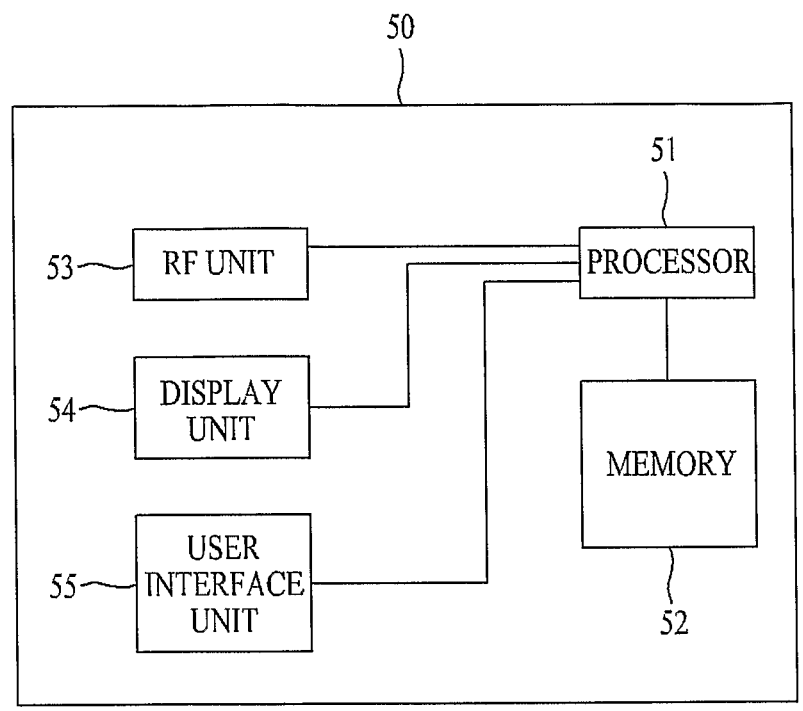
FIG. 16 is a block diagram illustrating constituent elements of a device applicable to the present invention.

FIG. 16 is a block diagram illustrating constituent elements of a device 50 applicable to the present invention.

In FIG. 16, the device 50 may be a UE or a base station (BS). In addition, the above-mentioned methods can be implemented by this device 50. The device 50 includes a processor 51, a memory 52, a Radio Frequency (RF) unit 53, a display unit 54, and a user interface unit 55. Layers of the radio interface protocol are realized in the processor 51. The processor 51 provides a control plane and a user plane. Functions of individual layers can be implemented in the processor 51. The processor 51 may include a contention resolution timer. The memory 52 is connected to the processor 51 and stores an operating system, applications, and general files. If the device 50 is a UE, the display unit 54 displays various information, and may use well-known elements such as a Liquid Crystal Display (LCD), an Organic Light Emitting Diode (OLED), and the like. The user interface unit 55 may be constructed of a combination of well-known user interfaces such as a keypad, a touch screen, and the like. The RF unit 53 is connected to the processor 51 so that it can transmit and receive RF signals to and from the processor 51.

Embodiment 1

Figure 17:
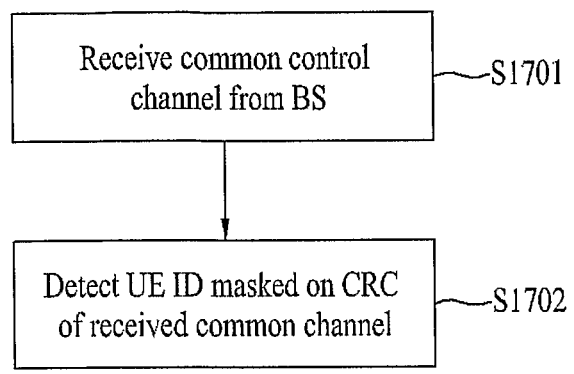
FIG. 17 is a flowchart illustrating a method for allowing a UE to receive a control channel according to the present invention.

FIG. 17 is a flowchart illustrating a method for allowing a UE to receive a control channel according to the present invention.

Referring to FIG. 17, the UE receives a common control channel transmitted from the base station (BS) at step S1701. Preferably, the common control channel may be a PDCCH. The UE is able to detect a UE ID masked on a CRC of the above common control channel at step S1702. The UE ID allocated to the above UE is represented by 'x' bits, and a second UE ID allocated to other UE receiving the dedicated control channel from the BS is represented by 'y' bits. In this case, the relationship of x<y is satisfied. The second UE ID allocated to the other UE is masked on a CRC of the dedicated control channel. In this case, the CRC of the common control channel is represented by 'x' bits, and the CRC of the dedicated control channel is represented by 'y' bits.

Alternatively, the method by FIG. 17 can be modified as follows. That is, the UE receives the control channel which is transmitted from the base station at step S1701. If the control channel is a common control channel, the UE ID allocated to the UE is represented by x bits. Otherwise, if the control channel is a dedicated control channel, the UE ID allocated to the UE is represented by y bits. In this case, the relationship x<y is satisfied. The UE ID is masked on the CRC of the control channel. Preferably, if the control channel is a common control channel, the CRC length z of the control channel is equal to or greater than the length x and less than the length y. If the control channel is a dedicated control channel, the CRC length of the control channel is greater than or equal to the length y. In this case, the ratio of the code rate of the common control channel to the code rate of the dedicated control channel is determined based on the ratio of the length x to the length y.

Embodiment 2

Figure 18:
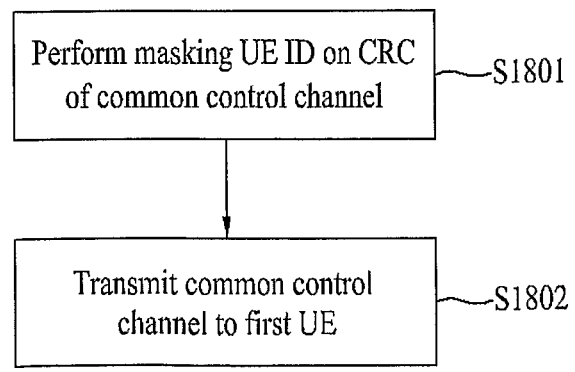
FIG. 18 is a flowchart illustrating a method for allowing a base station (BS) to transmit a control channel according to one embodiment of the present invention.

FIG. 18 is a flowchart illustrating a method for allowing a base station (BS) to transmit a control channel according to one embodiment of the present invention.

Referring to FIG. 18, the BS masks the UE ID at the CRC part of the common control channel at step S1801. The BS transmits the common control channel to the first UE at step S1802. Preferably, this common control channel may be a PDCCH. The BS can additionally transmit information of the dedicated control channel to the second UE. The first UE ID allocated to the first UE is represented by 'x' bits, and the second UE ID allocated to the second UE is represented by 'y' bits. In this case, the relationship of x<y is satisfied. The second UE ID allocated to the second UE is masked on the CRC of the dedicated control channel. In this case, the CRC of the common control channel is represented by 'x' bits, and the CRC of the dedicated control channel is represented by 'y' bits.

Alternatively, the method by FIG. 18 can be modified as follows. The BS masks a UE ID on the CRC part of the control channel at step S1801. The BS transmits the control channel to a UE at step S1802. If the control channel is a common control channel, the UE ID allocated to the UE is represented by x bits. Otherwise, if the control channel is a dedicated control channel, the UE ID allocated to the UE is represented by y bits. In this case, the relationship x<y is satisfied. The UE ID is masked on the CRC of the control channel. Preferably, if the control channel is a common control channel, the CRC length z of the control channel is equal to or greater than the length x and less than the length y. If the control channel is a dedicated control channel, the CRC length of the control channel is greater than or equal to the length y. The control channel may be a PDCCH. In this case, the ratio of the code rate of the common control channel to the code rate of the dedicated control channel is determined based on the ratio of the length x to the length y.

Embodiment 3

Figure 19:
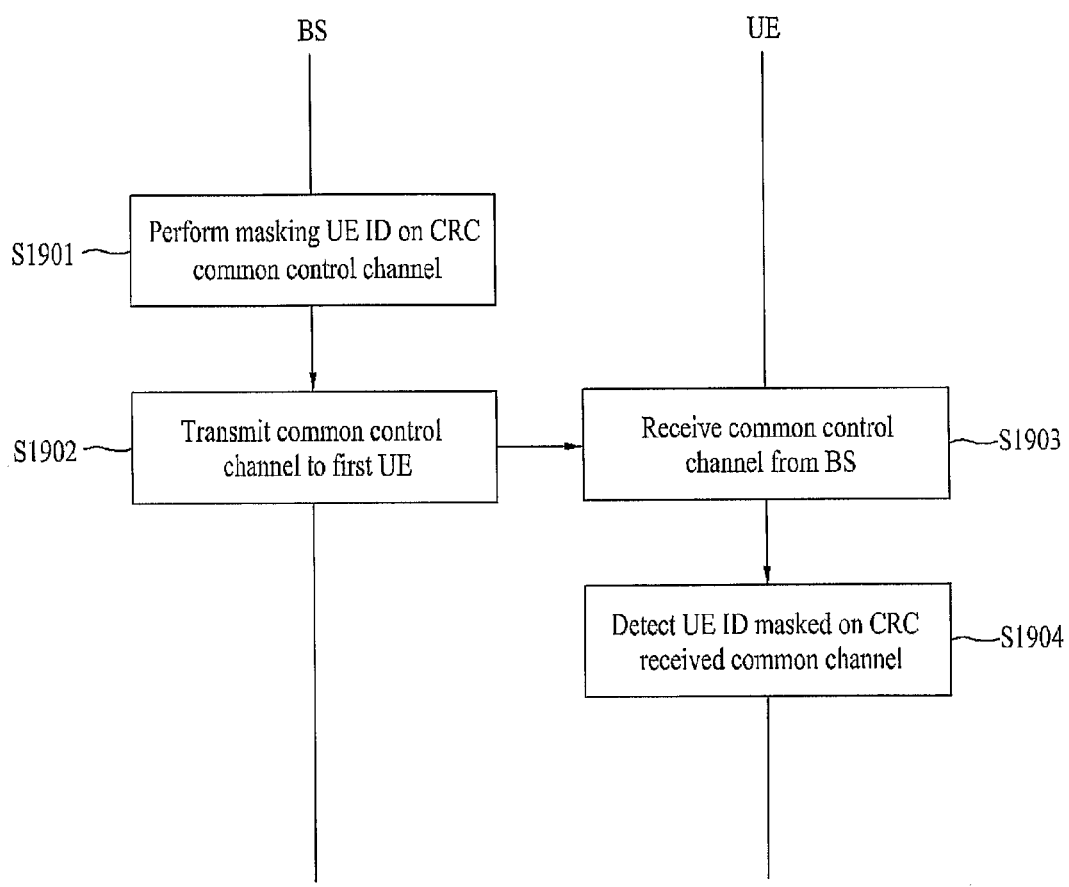
FIG. 19 is a flowchart illustrating a method for transmitting a control channel in a wireless mobile communication system according to one embodiment of the present invention.

FIG. 19 is a flowchart illustrating a method for transmitting a control channel in a wireless mobile communication system according to one embodiment of the present invention.

Referring to FIG. 19, the BS masks an UE ID on a CRC part of a common control channel at step S1901. The BS transmits the common control channel to a first UE at step S1902. The first UE receives the common control channel at step S1903. The UE can detect the UE ID masked on the CRC part of the common control channel at step S1904. Preferably, the common control channel may be a PDCCH. The first UE ID allocated to the first UE is represented by 'x' bits, and the second UE ID allocated to the second UE is represented by 'y' bits. In this case, the relationship of x<y is satisfied. The second UE ID allocated to the second UE is masked on the CRC of the dedicated control channel. In this case, the CRC of the common control channel is represented by 'x' bits, and the CRC of the dedicated control channel is represented by 'y' bits.

Alternatively, the method by FIG. 19 can be modified as follows. The BS masks a UE ID on the CRC part of the control channel at step S1901. The BS transmits the control channel to a UE at step S1902. The UE receives the control channel at step S1903. The UE can detect the UE ID which is masked on the CRC of the control channel at stet S1904. If the control channel is a common control channel, the UE ID allocated to the UE is represented by x bits. Otherwise, if the control channel is a dedicated control channel, the UE ID allocated to the UE is represented by y bits. In this case, the relationship x<y is satisfied. The UE ID is masked on the CRC of the control channel. Preferably, if the control channel is a common control channel, the CRC length z of the control channel is equal to or greater than the length x and less than the length y. If the control channel is a dedicated control channel, the CRC length of the control channel is greater than or equal to the length y. The control channel may be a PDCCH. In this case, the ratio of the code rate of the common control channel to the code rate of the dedicated control channel is determined based on the ratio of the length x to the length y.

Embodiment 4

If the device 50 shown in FIG. 16 is an UE, the above step S1701 shown in the first embodiment (Embodiment 1) may be carried out by the RF unit 53 and the processor 51, and the other step S1702 may be carried out by the processor 51.

Embodiment 5

If the device 50 shown in FIG. 16 is a base station (BS), the above step S1801 may be carried out by the processor 51, and the other step S1802 may be carried out by the processor 51 and the RF unit 53.

It can be easily appreciated by those skilled in the art that a wireless mobile communication system can be constructed by a combination of the UE based on the fourth embodiment (Embodiment 4) and the BS based on the fifth embodiment 5 (Embodiment 5).

Although the present invention has been disclosed by referring to the above-mentioned embodiments, it should be noted that the aforementioned embodiments have been disclosed only for illustrative purposes, and those skilled in the art will appreciate that various modifications, additions and substitutions are possible, without departing from the scope and spirit of the invention as disclosed in the accompanying claims. Thus, it is intended that the present invention covers the modifications and variations of this invention provided they come within the scope of the appended claims and their equivalents. Therefore, the present invention is not limited to the above-mentioned embodiments, but can be applied to other examples which can satisfy the above principles and new characteristics of the present invention.

INDUSTRIAL APPLICABILITY

As apparent from the above description, the present invention is applicable to a transmitter and a receiver for use in a broadband wireless communication system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of receiving control information at a user equipment (UE) in a wireless mobile communication system, the method comprising:
   receiving, at the UE, the control information on a control channel transferred from a base station, wherein,
   when the control channel is a common control channel, a UE ID (identifier) of the UE is represented by 'x' bits,
   else when the control channel is a dedicated control channel, the UE ID of the UE is represented by 'y' bits, and 'x'<'y' is satisfied.

2. The method according to claim 1, wherein a ratio of a code rate of the common control channel to a code rate of the dedicated control channel is determined based on a ratio of 'x' to 'y'.

3. The method according to claim 1, wherein the UE ID is masked on a cyclic redundancy check (CRC) of the control channel, and when the control channel is the common control channel, a CRC length 'z' of the control channel is equal to or greater than 'x' and less than 'y'.

4. The method according to claim 1, wherein the UE ID is masked on a cyclic redundancy check (CRC) of the control channel, and when the control channel is the dedicated control channel, a CRC length of the control channel is equal to or greater than 'y'.

5. The method according to claim 1, wherein the control channel is a PDCCH (Physical Downlink Control Channel).

6. A method of transmitting control information in a wireless mobile communication system, the method comprising:
   transmitting, at a base station, the control information on a control channel to a user equipment (UE),
   wherein, when the control channel is a common control channel, a UE ID (identifier) of the UE is represented by 'x' bits,
   else when the control channel is a dedicated control channel, the UE ID of the UE is represented by 'y' bits, and 'x'<'y' is satisfied.

7. The method according to claim 6, wherein a ratio of a code rate of the common control channel to a code rate of the dedicated control channel is determined based on a ratio of 'x' to 'y'.

8. The method according to claim 6, wherein the UE ID is masked on a cyclic redundancy check (CRC) of the control channel, and when the control channel is the common control channel, a CRC length 'z' of the control channel is equal to or greater than 'x' and less than 'y'.

9. The method according to claim 6, wherein the UE ID is masked on a cyclic redundancy check (CRC) of the control channel, and when the control channel is the dedicated control channel, a CRC length of the control channel is equal to or greater than 'y'.

10. The method according to claim 6, wherein the control channel is a PDCCH (Physical Downlink Control Channel).

11. A user equipment (UE) for a wireless mobile communication system, the user equipment (UE) comprising:
    a radio frequency (RF) unit; and
    a processor electrically connected to the RF unit,
    wherein the processor is configured to receive control information on a control channel transferred from a base station through the RF unit,
    when the control channel is a common control channel, a UE ID (identifier) of the UE is represented by 'x' bits,
    else when the control channel is a dedicated control channel, the UE ID of the UE is represented by 'y' bits, and 'x'<'y' is satisfied.

12. The user equipment according to claim 11, wherein a ratio of a code rate of the common control channel to a code rate of the dedicated control channel is determined based on a ratio of 'x' to 'y'.

13. The user equipment according to claim 11, wherein the UE ID is masked on a cyclic redundancy check (CRC) of the control channel, and when the control channel is the common control channel, a CRC length 'z' of the control channel is equal to or greater than 'x' and less than 'y'.

14. The user equipment according to claim 11, wherein the UE ID is masked on a cyclic redundancy check (CRC) of the control channel, and when the control channel is the dedicated control channel, a CRC length of the control channel is equal to or greater than 'y'.

15. The user equipment according to claim 11, wherein the control channel is a PDCCH (Physical Downlink Control Channel).

16. A base station for a wireless mobile communication system, the base station comprising:
    a radio frequency (RF) unit; and
    a processor electrically connected to the RF unit,
    wherein the processor is configured to transmit control information on a control channel to a user equipment (UE) through the RF unit,
    when the control channel is a common control channel, a UE ID (identifier) of the UE is represented by 'x' bits,
    else when the control channel is a dedicated control channel, the UE ID of the UE is represented by 'y' bits, and 'x'<'y' is satisfied.

17. The base station according to claim 16, wherein a ratio of a code rate of the common control channel to a code rate of the dedicated control channel is determined based on a ratio of 'x' to 'y'.

18. The base station according to claim 16, wherein the UE ID is masked on a cyclic redundancy check (CRC) of the control channel, and when the control channel is the common control channel, a CRC length 'z' of the control channel is equal to or greater than 'x' and less than 'y'.

19. The base station according to claim 16, wherein the control channel is a PDCCH (Physical Downlink Control Channel).

* * * * *